ns Patent [19]

Olcott

[11] 3,877,080
[45] Apr. 15, 1975

[54] ACICULAR SILICON CARBIDE DISPERSION IN PYROLYTIC GRAPHITE MATRIX FOR USE IN BIOMEDICAL IMPLANTS

[75] Inventor: Eugene L. Olcott, Falls Church, Va.

[73] Assignee: Atlantic Research Corporation, Alexandria, Va.

[22] Filed: Oct. 30, 1972

[21] Appl. No.: 301,778

[52] U.S. Cl. ..................... 3/1; 3/DIG. 1; 3/DIG. 3; 128/92 C; 128/92 BC; 264/42; 264/29; 117/46 CG
[51] Int. Cl. ............................ A61f 1/24; A61f 1/22
[58] Field of Search .... 3/1, DIG. 1, DIG. 2, DIG. 3; 128/92 C, 92 CA, 92 R, 92 BC, 334 R; 117/46 CG, 106 A, 106 C, DIG. 11; 161/168–170; 264/29

[56] References Cited
UNITED STATES PATENTS

| | | |
|---|---|---|
| 3,623,164 | 11/1971 | Bokros .......................................... 3/1 |
| 3,677,795 | 7/1972 | Bokros et al. .................. 117/46 CG |
| 3,685,059 | 8/1972 | Bokros et al. .............................. 3/1 |

*Primary Examiner*—Ronald L. Frinks
*Attorney, Agent, or Firm*—Finnegan, Henderson, Farabow & Garrett

[57] ABSTRACT

Prosthetic devices for implanting into a living body composed of a composite of a pyrolytic graphite matrix containing codeposited silicon carbide. The pyrolytic graphite matrix comprises crystallite layers of pyrolytic graphite while the silicon carbide is in the form of crystalline aciculae. The silicon carbide aciculae are embedded within the pyrolytic graphite crystallites and oriented so that the longitudinal axes are substantially aligned with the c-direction of the crystallites. The composites of the implant may have a plurality of pores on the surface. These pores can serve as sites for tissue and bone growth, thus improving the attachment of the implant.

11 Claims, 4 Drawing Figures

ACICULAR SILICON CARBIDE DISPERSION IN PYROLYTIC GRAPHITE MATRIX FOR USE IN BIOMEDICAL IMPLANTS

FIELD OF THE INVENTION

The present invention relates generally to prosthetic devices or biomedical implants, and, more particularly, to synthetic structures which may be implanted into human or other animal bodies. The implants of the present invention are composed of codeposited pyrolytic graphite and silicon carbide.

BACKGROUND OF THE INVENTION

The use of protheses for joints and the strengthening of fractured bones during healing has become commonplace in modern medical practice. Many parts of the skeletal system, especially those which bear the main weight of the body, are subject to great stress. When broken, these bones are difficult to heal rapidly and correctly. Moreover, the damage and deterioration of weight bearing in other joints, such as the hip joint, due to disease and other trauma, can result in immobility for the patient. The adaptation of artificial devices to replace and strengthen damaged bones has alleviated many such problems.

Intravascular prostheses have also been used for a number of years and it is expected that the uses of such devices will increase in the future as medical techniques continue to improve. Artificial heart valves are used fairly extensively today, and more complex circulatory assist devices are currently under development. Other examples of similar types of protheses include vascular grafts, replacement trachea and bronchi, etc.

As used herein, the expression "biomedical implant" includes protheses for implanting into humans or other animals. Included, without being limited hereto, are orthopedic implants such as synthetic structures which strengthen or replace sections of bone. Also included are other protheses in which a surface or surfaces are subjected to the flowing circulation of live blood, such as artificial heart valves and the like, as well as devices for attaching protheses to body tissue.

Many of the biomedical implants available today are subject to several limitations. Many of these devices are vulnerable to deterioration from chemical and galvanic corrosion. Such corrosion results in reduced strength of the prosthetic device and possible toxic reaction of the host tissues to the corrosion product. For this reason, many orthopedic implants are used only as a temporary measure until they can be removed or replaced. In addition, many of the materials used in biomedical implants are not only subject to degradation, they are also thrombogenic.

It has been found that carbon, such as pyrolytic graphite, is biocompatible. Prosthetic devices comprising carbonaceous materials such as pyrolytic graphite are disclosed, e.g., in U.S. Pat. Nos. 3,526,005; 3,526,906; and 3,623,164.

Pyrolytic graphite is normally produced by the pyrolysis of a carbonaceous gas, such as methane or propane, onto a heated substrate. The crystal structure of pyrolytic graphite is characterized by principal grains of a cone-like shape which are made of sub-grains or crystallites. The flat hexagonal crystallites, oriented substantially parallel to the substrate surface, are deposited in layers which build up into an essentially laminar structure.

Each crystallite has its own c-axis which is oriented at 90° to the ab plane and points toward the origin of the cone. Because the spherical cones are actually a curved rather than a flat plane, the c-axis of each crystallite is inclined somewhat from that of adjacent crystallites.

As a result of its laminar structure, pyrolytic graphite is highly anisotropic in many of its properties, including strength, heat conductivity, and thermal expansion. This anisotropy presents problems in certain uses of pyrolytic graphite. As an example, the material has an exceedingly high coefficient of thermal expansion in the thickness or c-axis direction and a relatively low coefficient of thermal expansion in the ab plane or direction. In addition, due to its flat, plate-like, and laminar microstructure, pyrolytic graphite is relatively weak in the c-direction and tends to delaminate under high stress.

In copending U.S. application Ser. No. 65,899, filed Aug. 21, 1970, now U.S. Pat. No. 3,738,906, there are disclosed novel, rigid microcomposites of pyrolytic graphite crystallites containing codeposited crystalline silicon carbide. The silicon carbide is in the form of aciculae embedded in the pyrolytic graphite crystallites. The longitudinal axes of the aciculae are aligned in the c-direction (perpendicular to the ab or flat plane) of the pyrolytic graphite crystallites.

The biomedical implants of the present invention are composed of such pyrolytic graphite-crystalline silicon carbide composites. The presence of the silicon carbide in the composite reduces the anisotropy of the graphite and the tendency of the graphite to delaminate. In addition, the presence of the silicon carbide allows the formation of minute pores or tunnels in the pyrolytic graphite. These pores can serve as sites for tissue and bone growth, thereby promoting improved attachment of the implant.

SUMMARY OF THE INVENTION

The present invention is directed to biomedical implants composed of a composite of a pyrolytic graphite matrix containing codeposited silicon carbide. The pyrolytic graphite matrix comprises crystallite layers of pyrolytic graphite while the silicon carbide is in the form of crystalline aciculae. The silicon carbide aciculae are embedded within the pyrolytic graphite crystallites and oriented so that their longitudinal axes are substantially aligned with the c-direction (perpendicular to the ab or flat plane) of the crystallites. The composite is a two-phase system since the pyrolytic graphite and the silicon carbide are mutually insoluble.

The amount of silicon carbide in the matrix should be at least about 5 percent, and preferably at least about 10 percent, by volume of the composite. Depending upon the desired properties, the percent of silicon carbide can be as high as about 90 percent and even 95 percent by volume. In general, the composite preferably comprises about 10 to 50 volume percent silicon carbide with pyrolytic graphite making up the remainder.

Embedding aciculae of silicon carbide within a matrix of pyrolytic graphite in such a manner that the longitudinal axes of the aciculae are oriented approximately in the c-direction of the pyrolytic graphite crystallites, reduces the anisotropy normally characteristic of pyrolytic graphite alone. This results in substantially increased strength in the dimension perpendicular to the deposition substrate and improvement in other properties. Additionally, the embedded silicon carbide aciculae interrupt the laminar pattern of the pyrolytic graphite and thus reduce its tendency to delaminate.

Since silicon carbide is considerably harder than pyrolytic graphite, the presence of silicon carbide in the composite improves wear resistance of the implant. The presence of the silicon carbide aciculae also provides the option of providing pores or tunnels of a predetermined length in the implant. The silicon carbide needles may be removed from the surface of the implant to form pores or tunnels of a predetermined depth by techniques such as leaching with fused KOH or exposing the composite for a short time to a very high temperature (above 4,000°F). These tunnels can serve as sites for tissue and bone growth, thus improving the attachment of the implant.

DETAILED DESCRIPTION OF THE INVENTION

Figure 1:
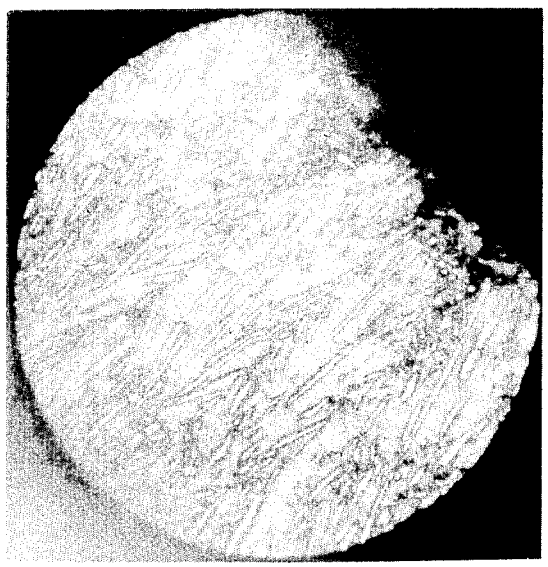
FIG. 1 is a photomicrograph at a magnification of 150 of a cross section of a sample of a pyrolytic graphite-silicon carbide microcomposite. The orthopedic implants of the present invention are composed of such composites.
Figure 2:
FIG. 2 is a photomicrograph at a magnification of 600 of the same section shown in FIG. 1.

The photomicrographs of FIGS. 1 and 2 at 150 $x$ and 600 $x$ magnification, respectively, clearly show the silicon carbide embedded in the pyrolytic graphite matrix. As shown in the photomicrographs, a large portion of the silicon carbide is in the form of needle-like aciculae oriented substantially perpendicularly to the codeposited laminar layers of pyrolytic graphite. The volume percent of the silicon carbide in the photomicrographed sample is about 20 percent. Such composite, containing about 20 percent by volume SiC, have been found to have, in the ab direction, flexure strengths of about 40,000 psi and an elastic modulus of about $5 \times 10^6$ psi.

The microcomposite can be made by vapor phase pyrolysis of a mixture of methyl trichlorosilane and a hydrocarbon gas onto a heated substrate. Apparatus and pyrolyzing techniques otherwise well known for the production of pyrolytic graphite may be employed. Pyrolysis may be conducted at reduced or atmospheric pressure. Atmospheric pressure is preferred for convenience and because of the excellent results obtained.

Figure 3:
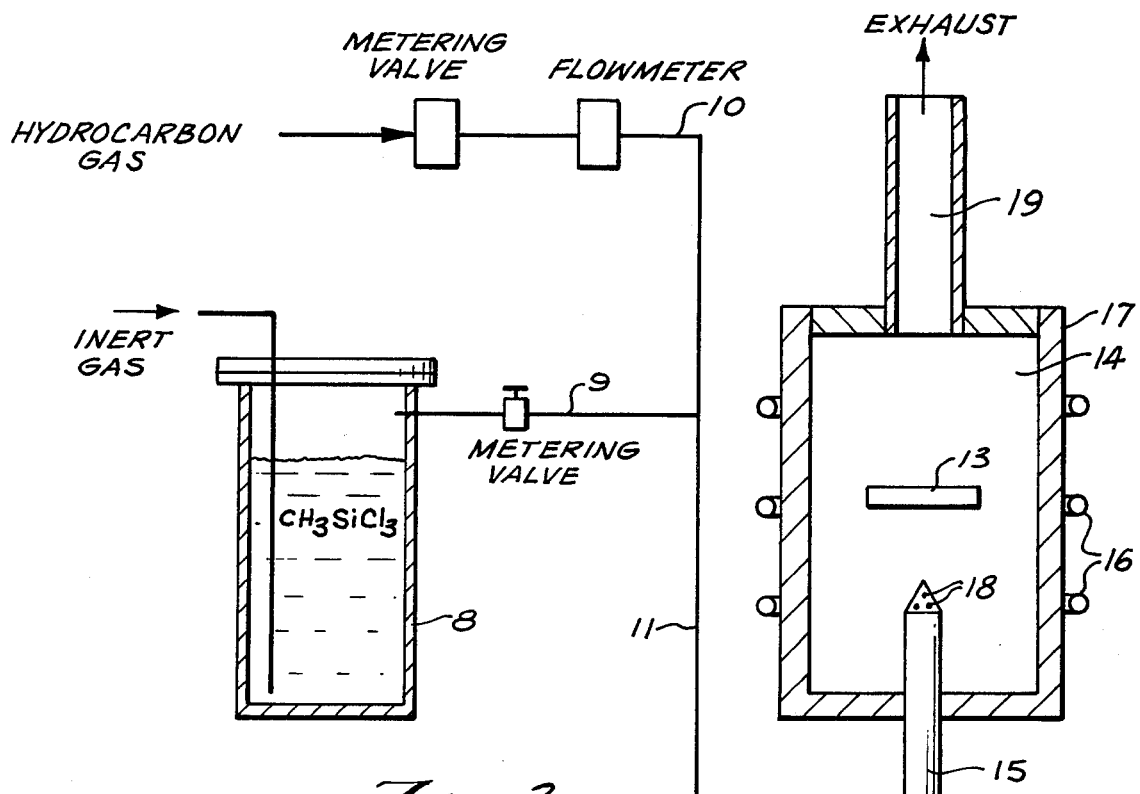
FIG. 3 is a schematic illustration of the apparatus used in the preferred manufacturing process for the article of this invention.

Suitable apparatus for preparing the composites of which the biomedical implants of the present invention are composed is schematically illustrated in FIG. 3. In operation, methyl trichlorosilane is aspirated by means of inert gas from a suitable container, such as a pressure vessel 8, through line 9 to line 11 and into injector tube 15. Preferably, an appropriate conventional metering valve, by which the flow rate of the $CH_3SiCl_3$ may be regulated, is included in line 9. Simultaneously, a hydrocarbon gas is fed through line 10 to line 11, where it mixes with the $CH_3SiCl_3$, and into injector tube 15. Preferably, line 10 includes an appropriate conventional metering valve and a conventional flow meter.

The mixture of methyl trichlorosilane and the hydrocarbon gas pass through injector tube 15 and exits through ports 18 into chamber 14 of furnace 17. Upon entry into chamber 14, the $CH_3SiCl_3$-hydrocarbon gas mixture impinges upon substrate 13 suspended in furnace 17. Furnace 17 and substrate 13 are heated to a temperature sufficient to pyrolize the methyl trichlorosilane and hydrocarbon gases (about 2,800°F–4,000°F and preferably 3,200°F–3,800°F) as by heating coils 16. It will be appreciated that any conventional induction, radiant, or resistance heating means may be employed.

To prevent oxidation of the carbonaceous gas, atmospheric oxygen is removed and continuously excluded from chamber 14. Atmospheric oxygen may be removed from chamber 14 through exhaust port 19 by evacuation and/or purging with inert gases, such as helium or nitrogen, using conventional means (not shown).

Pyrolysis of the methyl trichlorosilane and hydrocarbon gas occurs when the gas mixture impinges upon heated substrate 13. Upon pyrolysis, a pyrolytic graphite-silicon carbide microcomposite is formed on substrate 13. The microcomposite is composed of pyrolytic graphite crystallite layers containing embedded, codeposited aciculae of silicon carbide oriented perpendicularly to the ab plane of the crystallites. A substantial portion (at least 50 percent of the volume) of the SiC present in the composite comprises distinct aciculae having a length-to-length ratio of at least 2:1, and preferably at least 4:1.

The hydrocarbon gas can be any of those generally employed in producing pyrolytic graphite by vapor phase deposition. Such gases include the lower alkanes, e.g., methane, ethane, and propane; ethylene; acetylene; mixtures thereof; etc. Methane is preferred. It is generally desirable to include in the pyrolysis mixture an inert gas, such as argon, nitrogen, helium, hydrogen, or mixtures thereof. All or part of the inert gas may be used to aspirate liquid methyl trichlorosilane.

The relative flow rate of the methyl trichlorosilane and hydrocarbon gas varies generally with the desired microcomposite composition. In general, the silane may be introduced at a weight percent flow rate of about 5 to 75 percent, and preferably about 15 to 50 percent, and the hydrocarbon gas at a weight percent flow rate of about 25 to 95 percent, and preferably about 85 to 50 percent.

While FIG. 3 shows a flat substrate, substrate 13 may be of any desired shape. For example, the composite may be deposited on a shaped substrate such as a rod. After completion of the build-up of the composite, the composite, along with the substrate, can be removed from chamber 14 and the composite formed into an orthopedic implant. The composite may be removed from the substrate, or the substrate may form an integral part of the biomedical implant. The composite may be formed into a shape suitable for use as an orthopedic implant by machining or other suitable forming techniques.

Figure 4:
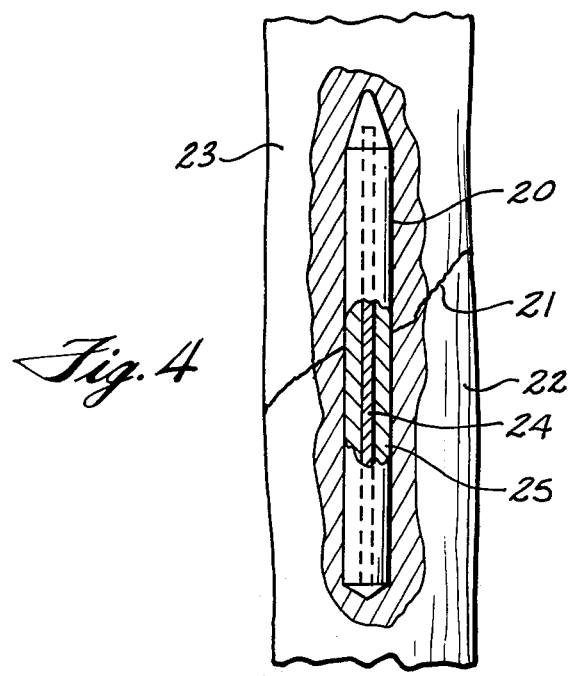
FIG. 4 is an illustration in partial cross section of a bone pin embodying various features of the orthopedic implants of the present invention.

FIG. 4 illustrates a practical application of an orthopedic implant within the scope of the present invention. FIG. 4 depicts a relatively long bone pin 20 disposed within the bone marrow. The bone pin extends a sufficient distance on either side of a break 21 to carry the full loading from the undamaged area of one bone fragment 22 to the undamaged area of the other fragment 23. The bone pin 20 comprises rod-shaped substrate 24 entirely covered with a composite 25 of pyrolytic graphite and silicon carbide. The substrate may be of any suitable metal or metallic alloy, such as stainless steel, titanium alloy, of Vitallium, or, preferably, of a carbonaceous material, such as synthetic graphite, graphite fibers, or other carbon composite. The composite, which is of the type shown more clearly in the photomicrographs of FIGS. 1 and 2, comprises pyrolytic graphite crystallite layers containing aciculae of crystalline silicon carbide embedded within the crystallites. The aciculae are oriented so that their longitudinal axes are substantially aligned with the c-direction of the crystallites.

While the orthopedic implant depicted in FIG. 4 contains a substrate coated with pyrolytic graphite, it will be appreciated that the orthopedic implant may be entirely of pyrolytic graphite. Separation of the pyrolytic graphite-SiC composite from the deposition substrate is readily accomplished. It will be further appreciated that while FIG. 4 depicts a bone pin, other biomedical implants, such as replacement parts for joints, artificial heart valves, etc., are also contemplated.

The embedded, codeposited silicon carbide aciculae tend to prevent propagation of cracks and delaminations. Composite strength in the dimension perpendicular to the deposition substrate is significantly enhanced and the marked disparity in thermal expansion in the ab and c-directions characteristic of conventional pyrolytic graphite is reduced. In addition, since SiC is harder than pyrolytic graphite, wear resistance is enhanced. This is a particularly important feature with respect to orthopedic implants subject to wear, e.g., replacements for the ball section of the ball-and-socket hip joint.

The biocompatibility, strength, wear-resistance, and corrosion-resistance of the composites of the present invention allow orthopedic implants to remain permanently within the bone unless other physiological factors dictate otherwise. As long as the implant is in place, it will perform very much like natural bone. In addition, the implants of the present invention are conducive to new bone growth.

After biomedical implants have been formed from pyrolytic graphite-silicon carbide composites in accordance with the present invention, a plurality of tunnels or pores may be formed in the surface of the implant by removing SiC aciculae on the surface of the composite. These small tunnels or pores can serve as sites for tissue and bone growth, thereby improving attachment of the implants.

One method of removing aciculae relies on the fact that silicon carbide sublimes at temperatures above about 4,000°F. Pyrolytic graphite, on the other hand, is able to withstand temperatures in excess of 6,500°F without adverse effect. Thus, by heating the orthopedic implants to temperatures above 4,000°F and below temperatures at which pyrolytic graphite will sublime or decompose, the silicon carbide aciculae on the surface of the implant are removed. The result is a plurality of pores in the surface of the implant.

The depth of the removal of the silicon carbide is a function of the specific temperature employed and the length of time to which the implant is exposed to the elevated temperature. Normally, pores of a depth of about 100 microns are suitable. Such pores can be obtained by exposure to a temperature of about 5,000°F for 1 to 5 minutes.

Since pyrolytic graphite is subject to oxidation at elevated temperatures, the biomedical implant should be heated in a non-oxidizing environment. For example, heating can take place in an atmosphere of an inert gas, such as argon, nitrogen, helium, hydrogen, etc.

Alternatively, pores of a suitble depth can be obtained by immersing the composite implants in a bath of fused potassium hydroxide for a short time, e.g., 1 to 5 minutes or longer. The molten KOH leaches the SiC needles from the composite without affecting the pyrolytic graphite matrix.

This invention in its broader aspects is not limited to the specific details shown and described and departures may be made from such details without departing from the principles of the invention and without sacrificing its chief advantages.

What is claimed is:

1. A biomedical implant composed of a composite of pyrolytic graphite and silicon carbide in which said pyrolytic graphite comprises layers of crystallites of pyrolytic graphite and said silicon carbide comprises codeposited crystalline aciculae embedded in said crystallites, said aciculae being oriented so that the longitudinal axes of the aciculae are substantially aligned with the c-direction of said crystallites.

2. The implant of claim 1 in which said composite has a plurality of pores on its surface.

3. The implant of claim 1 in which said composite coats a metallic substrate.

4. The implant of claim 1 in which said composite coats a carbonaceous substrate.

5. The implant of claim 1 in which said composite comprises at least 10 percent by volume silicon carbide.

6. The implant of claim 1 in which said composite comprises between about 5 and 95 percent by volume silicon carbide.

7. The implant of claim 1 in which said composite comprises about 10 to 50 volume percent silicon carbide.

8. The implant of claim 1 in which at least 50 percent of the volume of silicon carbide present in said composite comprises aciculae having a length-to-diameter ratio of at least 2:1.

9. The implant of claim 1 in which at least 50 percent of the volume of silicon carbide present in said composite comprises aciculae having a length-to-diameter ratio of at least 4:1.

10. The implant of claim 1 which is in the form of an orthopedic prosthetic device.

11. The implant of claim 2 which is in the form of an orthopedic prosthetic device.

* * * * *